US006974508B1

(12) United States Patent
Gabb et al.

(10) Patent No.: US 6,974,508 B1
(45) Date of Patent: Dec. 13, 2005

(54) NICKEL BASE SUPERALLOY TURBINE DISK

(75) Inventors: Timothy P. Gabb, Independence, OH (US); John Gayda, Avon Lake, OH (US); Ignacy Telesman, Hudson, OH (US); Pete T. Kantzos, Canton, OH (US)

(73) Assignee: The United States of America as represented by the United States National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/283,220

(22) Filed: Oct. 29, 2002

(51) Int. Cl.$^7$ .............................................. C22C 19/05
(52) U.S. Cl. ................... 148/428; 420/447; 420/448; 420/449; 420/450; 415/200; 416/223 R; 416/241 R
(58) Field of Search ..................... 148/428; 420/447, 420/448, 449, 450; 415/200; 416/223 R, 416/241 R

(56) References Cited

U.S. PATENT DOCUMENTS

| | | | |
|---|---|---|---|
| 2,570,193 A | 10/1951 | Bieber et al. | |
| 2,621,122 A | 12/1952 | Gresham et al. | |
| 3,046,108 A | 7/1962 | Eiselstein | |
| 3,061,426 A | 10/1962 | Bieber | |
| 3,151,981 A | 10/1964 | Smith et al. | |
| 3,166,412 A | 1/1965 | Bieber | |
| 3,322,534 A | 5/1967 | Shaw et al. | |
| 3,343,950 A | 9/1967 | Richards et al. | |
| 3,519,503 A | 7/1970 | Moore et al. | |
| 3,575,734 A | 4/1971 | Muzyka et al. | |
| 4,127,410 A | 11/1978 | Merrick et al. | |
| 4,336,312 A | 6/1982 | Clark et al. | |
| 4,358,318 A | 11/1982 | Merrick et al. | |
| 4,388,124 A | 6/1983 | Henry | |
| 4,685,977 A | 8/1987 | Chang | |
| 4,814,023 A | 3/1989 | Chang | |
| 4,820,353 A | 4/1989 | Chang | |
| 4,820,358 A | 4/1989 | Chang | |
| 4,867,812 A | 9/1989 | Henry | |
| 4,888,064 A | 12/1989 | Chang | |
| 4,894,089 A | 1/1990 | Henry | |

(Continued)

FOREIGN PATENT DOCUMENTS

EP        1195446 A1      4/2002

(Continued)

OTHER PUBLICATIONS

"High Temperature Turbine Disk Program," Phase 5 Final Report, May 15, 2001, pp. 1-19.

*Primary Examiner*—John P Sheehan
(74) *Attorney, Agent, or Firm*—Kent N. Stone; Daniel D. Wasil; Walker & Jocke

(57) ABSTRACT

A low solvus, high refractory alloy having unusually versatile processing mechanical property capabilities for advanced disks and rotors in gas turbine engines. The nickel base superalloy has a composition consisting essentially of, in weight percent, 3.0–4.0 Al, 0.02–0.04 B, 0.02–0.05 C, 12.0–14.0 Cr, 19.0–22.0 Co, 2.0–3.5 Mo, greater than 1.0 to 2.1 Nb, 1.3 to 2.1 Ta, 3.0–4.0 Ti, 4.1 to 5.0 W, 0.03–0.06 Zr, and balance essentially Ni aid incidental impurities. The superalloy combines ease of processing with high temperature capabilities to be suitable for use in various turbine engine disk, impeller, and shaft applications. The Co and Cr levels of the superalloy can provide low solvus temperature for high processing versatility. The W, Mo, Ta, and Nb refractory element levels of the superalloy can provide sustained strength, creep, and dwell crack growth resistance at high temperatures.

17 Claims, 8 Drawing Sheets

U.S. PATENT DOCUMENTS

| | | |
|---|---|---|
| 4,981,644 A | 1/1991 | Chang |
| 4,983,233 A | 1/1991 | Henry |
| 5,037,495 A | 8/1991 | Henry |
| 5,055,147 A | 10/1991 | Henry |
| 5,080,734 A | 1/1992 | Krueger et al. |
| 5,087,305 A | 2/1992 | Chang |
| 5,104,614 A | 4/1992 | Ducrocq et al. |
| 5,120,373 A | 6/1992 | Miller et al. |
| 5,124,123 A | 6/1992 | Henry |
| 5,129,968 A | 7/1992 | Henry |
| 5,129,969 A | 7/1992 | Henry |
| 5,129,970 A | 7/1992 | Henry |
| 5,129,971 A | 7/1992 | Henry |
| 5,130,086 A | 7/1992 | Henry |
| 5,130,087 A | 7/1992 | Henry |
| 5,130,088 A | 7/1992 | Henry |
| 5,143,563 A | 9/1992 | Krueger et al. |
| 5,156,808 A | 10/1992 | Henry |
| 5,161,950 A | 11/1992 | Krueger et al. |
| 5,312,497 A | 5/1994 | Mathey |
| 5,482,789 A | 1/1996 | O'Hara et al. |
| 5,527,020 A | 6/1996 | Ganesh et al. |
| 5,527,402 A | 6/1996 | Ganesh et al. |
| 5,571,345 A | 11/1996 | Ganesh et al. |
| 5,662,749 A | 9/1997 | Chang |
| 5,815,792 A | 9/1998 | Duquenne et al. |
| 5,938,863 A | 8/1999 | Malley |
| 6,106,767 A * | 8/2000 | Kennedy et al. ............ 420/448 |
| 6,132,535 A | 10/2000 | Okada et al. |
| 6,175,495 B1 | 1/2001 | Batchelder |
| 6,521,175 B1 * | 2/2003 | Mourer et al. ............. 420/448 |

FOREIGN PATENT DOCUMENTS

| | | |
|---|---|---|
| EP | 1201777 A1 | 5/2002 |

* cited by examiner

NICKEL BASE SUPERALLOY TURBINE DISK

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

TECHNICAL FIELD

This invention relates in general to nickel base alloy. More particularly, this invention relates to a nickel base superalloy having a unique combination of versatile heat treatment processing capabilities and superior mechanical properties at elevated temperatures up to 760–815° C. (1400–1500° F.).

BACKGROUND OF THE INVENTION

It is known that nickel-based superalloys have been employed in high performance environments. Such alloys have been used in machinery, such as gas turbine engines, where they have retained high strength and other desirable physical properties at elevated temperatures of up to 650° C. (1200° F.). An example of such an alloy may be found in U.S. Pat. No. 3,519,503, the disclosure of which is incorporated herein by reference.

The operation of a gas turbine engine is known. Air compressed by a shaft-mounted compressor disk can be mixed with fuel. The ignited mixture can result in a hot exhaust gas which can power the compressor and drive the engine. A turbine disk may be mounted to a drive shaft. Turbine blades can extend from the periphery of the turbine disk. The compressor disk can be mounted to a shaft which is driven by the turbine shaft.

The turbine disks which support the turbine blades may rotate at high speeds in an elevated temperature environment. These turbine disks may encounter different operating conditions radially from the center or hub portion to the exterior or rim portion. For example, the turbine blades are exposed to high temperature combustion gases which rotate the turbine. The turbine blades may transfer heat to the rim portion or section of the disk. As a result, the temperatures in the rim portion may be higher than those in the hub or bore portion. Furthermore, the stress conditions may also vary across the turbine disk.

Aerospace and space propulsion may require materials capable of peak temperatures as high as 760–815° C. (1400–1500° F.). Other propulsion systems, such as commercial aircraft engines in cruise conditions, may operate at moderately elevated temperatures for long periods of time. There is needed an alloy capable of providing improved physical and mechanical properties at these high temperatures and/or at these elevated temperature time periods.

Previous attempts to modify alloy chemistry for improved strength and time-dependent properties at high temperatures included increasing the content of strengthening gamma prime precipitates, and increasing the inherent strength and time-dependent properties of the gamma prime and gamma phases. The content of gamma prime precipitates can be increased by increasing the amounts of certain elements which stabilize and preferentially reside in the gamma prime phase precipitates. The inherent strength and time-dependent properties of the gamma prime phase precipitates can be increased by increasing the amounts of certain refractory elements to take the place of Al atoms in the L12 crystal lattice of gamma prime. The inherent strength and time-dependent properties of the gamma matrix phase can be increased by providing more refractory elements to take the place of Ni atoms in the FCC crystal lattice. However, these previous approaches have resulted in alloys with disadvantages and/or limitations. For example, problems still remain for the "Supersolvus" class of alloys optimized with coarse grain microstructures for mechanical properties at high temperatures in the range of 704–815° C., typified in U.S. Pat. No. 5,143,563 (the disclosure of which is incorporated herein by reference) and U.S. Pat. No. 5,662,749 (the disclosure of which is incorporated herein by reference). These alloys remain difficult to heat treat, require high solution temperatures often above 1160° C. for coarse grain size, and/or are difficult to quench without forming cracks. Even with coarse grain size, the alloys tend to have insufficient creep, tensile, and fatigue properties at temperatures approaching 815° C. than required. For the alternative "Subsolvus" class of alloys, typified in U.S. Pat. No. 3,519,503 (the disclosure of which is incorporated herein by reference) and U.S. Pat. No. 5,104,614 (the disclosure of which is incorporated herein by reference), which are heat treated at lower solution temperatures and optimized with fine grain microstructures for mechanical properties up to 704° C., problems also still remain. They do not have sufficient strength, creep, and fatigue properties at temperatures up to 815° C. The Subsolvus alloys also do not respond favorably to alternative coarse grain heat treatments, due in part to their high gamma prime solvus temperatures. Advanced dual microstructure heat treatments were thereby difficult to apply successfully to either the Supersolvus or Subsolvus class alloys. Additionally, while advanced dual microstructure heat treatments could be applied to a more recent "Balanced subsolvus/supersolvus" class of alloys, typified in European Patent Application EP 1 195 446 A1 (the disclosure of which is incorporated herein by reference), these alloys also had insufficient tensile and creep properties at the temperatures required.

Thus, there exists a need for a high temperature, high versatility alloy capable of use in advanced propulsion applications. In particular there is a need for a disk superalloy having higher inherent strength and creep resistance near the peak rim temperatures, maintained dwell crack growth resistance at lower temperatures, and sufficient phase stability at these temperatures for expected total service lives approaching several thousands of hours.

DISCLOSURE OF INVENTION

It is an object of an exemplary form of the present invention to provide compositions of matter, articles using the compositions of matter, and processing methods for the compositions of matter that achieve improved combinations of properties in high temperature conditions and applications.

It is a further object of an exemplary form of the present invention to provide a nickel base alloy.

It is a further object of an exemplary form of the present invention to provide a nickel base superalloy useful in disks, shafts, impellers, turbine disks, turbine shafts, compressor disks, compressor shafts, and compressor impellers.

It is a further object of an exemplary form of the present invention to provide a nickel base alloy having a sufficiently low gamma prime solvus temperature that is capable of being processed and heat treated at high rates of success to produce uniform coarse grain microstructures maximizing strength and time dependent properties at high temperatures up to about 815° C.

It is a further object of an exemplary form of the present invention to provide a nickel base alloy having a sufficiently low gamma prime solvus temperature that is capable of being processed and heat treated at high rates of success to produce uniform fine grain microstructures possessing very high strength properties at temperatures up to about 704° C.

It is a further object of an exemplary form of the present invention to provide a nickel base alloy having a sufficiently low gamma prime solvus temperature that is capable of being given dual microstructure solution heat treatments at high rates of success.

It is a further object of an exemplary form of the present invention to provide the capability of producing a turbine disk alloy with dual microstructure solution heat treatments, including higher solution heat treatment temperatures in the disk rim producing coarse grain microstructures, and lower solution heat treatment temperatures in the disk bore producing fine grain microstructures.

It is a further object of an exemplary form of the present invention to provide the capability of producing a turbine disk alloy with dual microstructure having coarse grain microstructures capable of withstanding 815° C. and fine grain microstructures capable of withstanding 704° C.

It is a further object of an exemplary form of the present invention to provide a nickel base superalloy capable of being produced using conventional powder metallurgy processing.

Further objects of exemplary forms of the present invention will be made apparent in the following Best Mode for Carrying Out Invention and the appended claims.

The foregoing objects are accomplished in exemplary embodiments of the present invention by a nickel base superalloy having a composition consisting essentially of, in weight percent, 3.0–4.0 Al, 0.02–0.04 B, 0.02–0.05 C, 12.0–14.0 Cr, 19.0–22.0 Co, 2.0–3.5 Mo, greater than 1.0 to 2.1 Nb, greater than 1.0 to 2.1 Ta, 3.0–4.0 Ti, greater than 3.0 to 5.0 W, 0.03–0.06 Zr, balance essentially Ni. That is, for each of Nb and Ta the weight percent is greater than 1.0 but less than or equal to about 2.1.

In an exemplary embodiment the nickel base superalloy may have a composition consisting essentially of, in weight percent, about 3.5 Al, about 0.03 B, about 0.03 C, about 12.5 Cr, about 20.7 Co, about 2.7 Mo, about 1.5 Nb, about 1.6 Ta, about 3.5 Ti, about 4.3 W, about 0.05 Zr, balance essentially Ni and impurities. The ratio of Al/Ti may be about 0.94–1.00.

In a further exemplary embodiment the nickel base superalloy may have a composition consisting essentially of, in weight percent, 3.46 Al, 0.028 B, 0.029 C, 12.52 Cr, 20.70 Co, 2.73 Mo, 1.45 Nb, 1.60 Ta, 3.50 Ti, 4.33 W, 0.049 Zr, balance Ni and impurities.

The compositions may be prepared in powder form, and processed into articles by combinations of extrusion, hot isostatic pressing, isothermal forging, heat treating, and/or other operable techniques. Articles made with the compositions may include turbine and compressor disks and shafts, and compressor impellers for gas turbine engines. Articles may be heat treated, either by solution treating and ageing or by solution treating followed by controlled cooling.

In an exemplary embodiment a turbine disk, which has a disk rim portion and a disk bore portion or section, can comprise a nickel base superalloy having a composition of the present invention. The superalloy permits a disk rim portion to have uniform coarse grain microstructures with superior tensile strength, fatigue, creep, and fatigue crack growth resistance properties at temperatures of about 704° C. to about 815° C. The nickel base superalloy also permits a turbine disk bore portion or a compressor disk to have uniform fine grain microstructures with superior tensile strength, fatigue, creep, and fatigue crack growth resistance properties at temperatures of about 25° C. to about 704° C. The alloy is also capable of being non-uniformly heat treated to produce both uniform fine grain microstructures in a turbine disk bore portion and uniform coarse grain microstructures in a turbine disk rim portion. Thus, the alloy permits a disk to have the most favorable microstructures in each disk portion, thereby producing optimal mechanical properties for each disk portion based on their respective application temperatures.

BEST MODE FOR CARRYING OUT INVENTION

Figure 1:
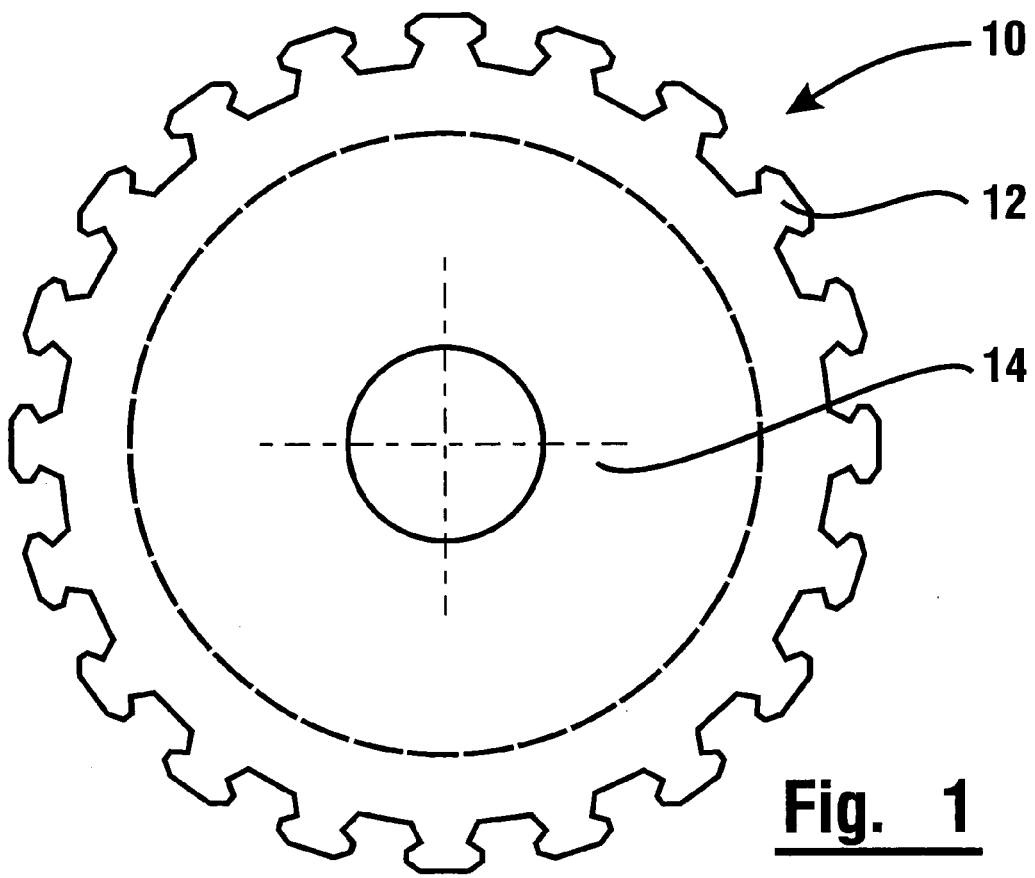
FIG. 1 shows a top of a turbine disk for a gas turbine.

The composition of matter of the present invention consists essentially of, in weight percent, from about 3.0 percent to about 4.0 percent aluminum (Al), from about 0.02 percent to about 0.04 percent boron (B), from about 0.02 percent to about 0.05 percent carbon (C), from about 12.0 percent to about 14.0 percent chromium (Cr), from about 19.0 percent to about 22.0 percent cobalt (Co), from about 2.0 percent to about 3.5 percent molybdenum (Mo), from greater than about 1.0 percent to about 2.1 percent niobium (Nb), from greater than about 1.0 percent to about 2.1 percent tantalum (Ta), from about 3.0 percent to about 4.0 percent titanium (Ti), from greater than about 3.0 percent to about 5.0 percent tungsten (W), from about 0.03 percent to about 0.06 percent zirconium (Zr), and the balance essentially nickel (Ni) and incidental impurities.

An alloy including the composition was conceived having a unique combination of beneficial versatile processing properties and resulting mechanical properties at elevated temperatures up to 815° C. The alloy composition can be highly versatile in heat treatments. The alloy provides excellent tensile and creep properties at a solvus temperature of below 1160° C. enabling versatile disk processing. Solution heat treatments can be performed at temperatures far below the alloy melting temperature, to produce either uniform fine grain microstructures possessing very high strength, fatigue, creep, and fatigue crack growth properties at temperatures from 25–704° C., or uniform coarse grain microstructures maximizing tensile strength, fatigue, creep, and fatigue crack growth properties at higher temperatures of 704–815° C. The alloy when properly heat treated is also able to be quenched at a wide range of cooling rates in either case (i.e., fine or coarse grain microstructures) with low probability of forming quench cracks. The alloy properties are also well suited for optimized dual microstructure solution heat treatments using higher solution heat treatment temperatures in a disk rim region to produce coarse grain microstructures, and lower solution heat treatment temperatures in a disk bore region to produce fine grain microstructures. Thus, exemplary forms of the present invention permit a versatile disk alloy capable of uniform coarse grain, uniform fine grain, or dual heat treatment microstructures.

An alloy of the composition has versatile processing options for using low risk, conventional uniform processing to produce superior mechanical properties that can be tailored to the alloy application. For example, the alloy is applicable to coarse grain microstructures producing superior creep and strength properties. The alloy is also applicable to fine grain microstructures producing superior strength and fatigue resistance. These options provide improved mechanical properties combined with lower risk of rejections due to quench cracking or process temperature/time tolerance exceedance.

The alloy of the composition is capable for use in advanced, differential heat treat processing for higher performance applications. For example, the alloy can be used in article applications such as turbine disks, turbine shafts, compressor disks, compressor shafts, and compressor impellers to impart the alloy properties thereto. The operation of such disks, shafts, and impellers is well known and need not be further described herein. Collectively herein, the turbine disks and compressor disks may be termed "turbine disks," and the turbine shafts and compressor shafts may be termed "turbine shafts." The Ni alloy can also be given subsequent heat treatment steps to relieve excessive residual stresses for improved machinability while preserving superior mechanical properties. Thus, the alloy provides producibility and component manufacturing flexibility.

The alloy of the composition permits turbine disks bores and compressor disks to have uniform fine grain microstructures possessing very high strength, fatigue, creep, and fatigue crack growth properties at temperatures from 25–704° C. The alloy of the composition also permits a turbine disk rim portion to have uniform coarse grain microstructures with superior tensile strength, fatigue, creep, and fatigue crack growth resistance properties at temperatures of about 704° C. to about 815° C.

FIG. 1 shows a side view of an exemplary embodiment of a turbine disk 10 for a gas turbine. The disk 10 has a dual microstructure. A rim portion 12 has a coarse grain microstructures capable of withstanding temperatures at about 815° C. A bore portion 14 has fine grain microstructures capable of withstanding temperatures at about 704° C.

Figure 2:
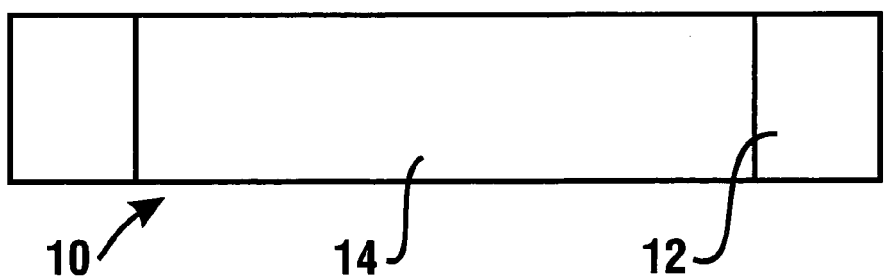
FIG. 2 shows a side view of a turbine disk for a gas turbine.

FIG. 2 depicts a cut away top view of the turbine disk 10 of FIG. 1. Of course it should be understood that the boundary between coarse and fine grain microstructures may not necessarily be exact. That is, mixing, overlapping, and varying of boundaries may occur. Of course other boundary locations may also be applicable.

Figure 3:
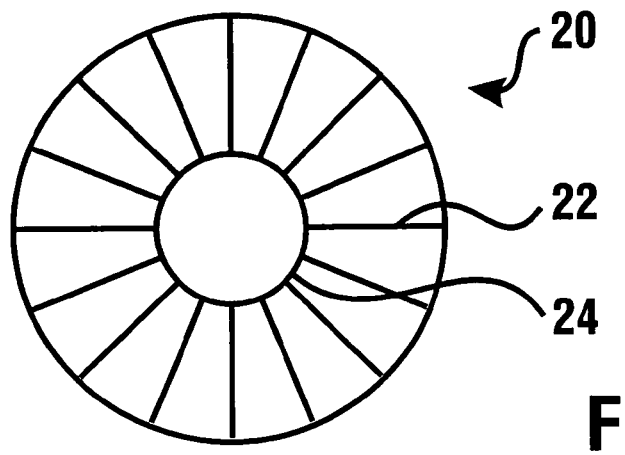
FIG. 3 shows a top view of a gas turbine compressor impeller.

FIG. 3 shows a top view of an exemplary embodiment of a gas turbine compressor impeller 20. The impeller is shown with blades 22 and a shaft 24.

Figure 4:
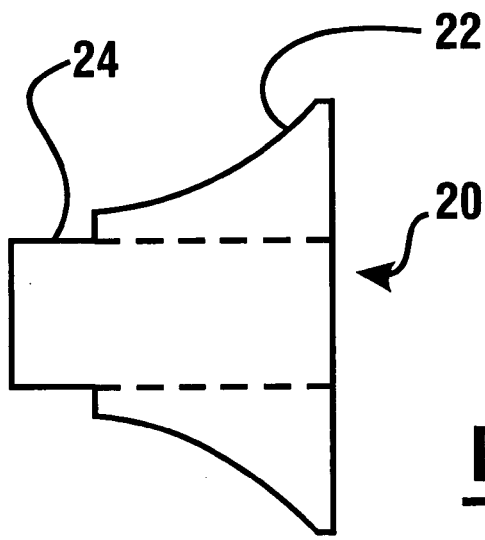
FIG. 4 shows a cut away side view of a gas turbine compressor impeller.

FIG. 4 shows a cut away side view of the compressor impeller of FIG. 3. The broken lines represent a hidden shaft portion.

Figure 5:
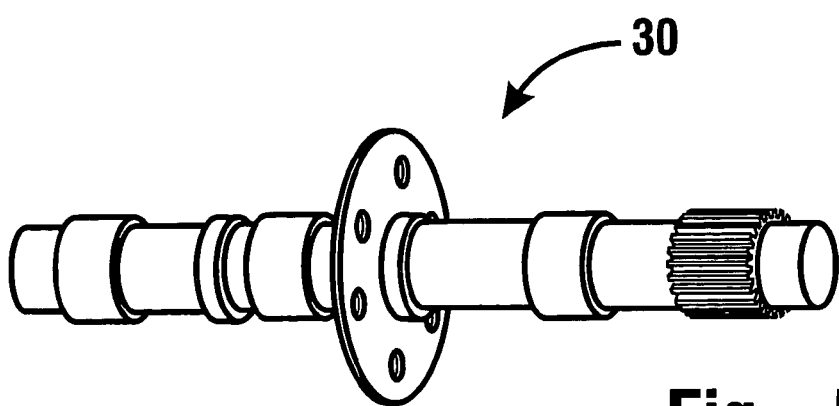
FIG. 5 shows a shaft for a gas turbine.

FIG. 5 shows an exemplary embodiment of a shaft 30 for a gas turbine.

A compressor disk may have an appearance which is generally similar to that of a turbine disk. A compressor shaft may have an appearance which is generally similar to that of a turbine shaft.

An alloy of the composition can be processed and heat treated to produce either uniform coarse grain microstructures maximizing strength and time dependent properties at high temperatures up to 815° C. for compressor or turbine disks, or uniform fine grain microstructures possessing very high strength properties at lower temperatures from 25 to 704° C. for compressor or turbine disks. The alloy also has the capability of being given dual microstructure solution heat treatments ideally optimized for turbine disks, using higher solution heat treatment temperatures in the disk rim to produce coarse grain microstructures and lower solution heat treatment temperatures in the disk bore to produce fine grain microstructures. Thus, the alloy can provide higher temperature capability in the hot turbine disk rim while extracting the higher strength and fatigue resistance at lower temperatures for the cooler bore in a high performance turbine disk. It follows that the alloy can also permit higher average compressor air exit temperatures and allow the utilization of advanced combustor and airfoil concepts.

FIGS. 6–14 show graphs of tensile strength and creep resistance as functions of temperature for an alloy of the present invention. Solvus-C represents alloy solvus temperature in Celsius. YS represents tensile yield strength. UTS represents ultimate tensile strength. These properties are influenced by heat treatment cooling rates as well as chemistry, therefore the properties of the alloy are expressed as a range to cover a very wide and versatile range of cooling rates of 40–167° C./min. As can be seen for both coarse and fine grain microstructures, the alloys of the present invention offer an excellent combination of tensile and creep properties at a low solvus temperature of below 1160° C. Thus, alloys of the present invention, with a low solvus temperature, permit versatile disk processing.

Figure 6:
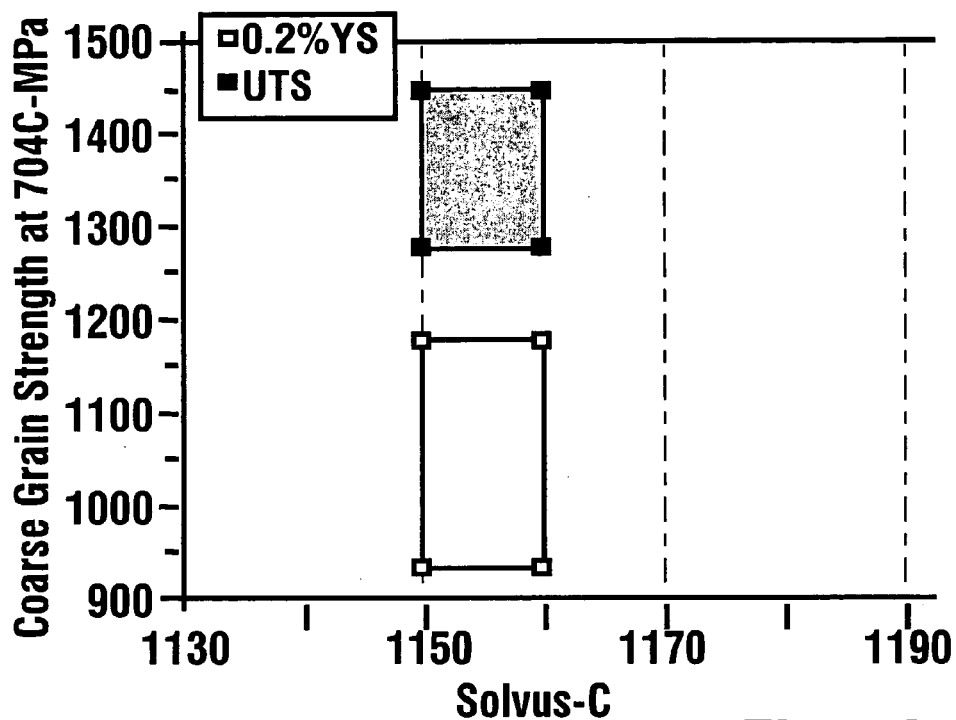
FIG. 6 shows coarse grain alloy typical tensile strength properties at 704° C.
Figure 7:
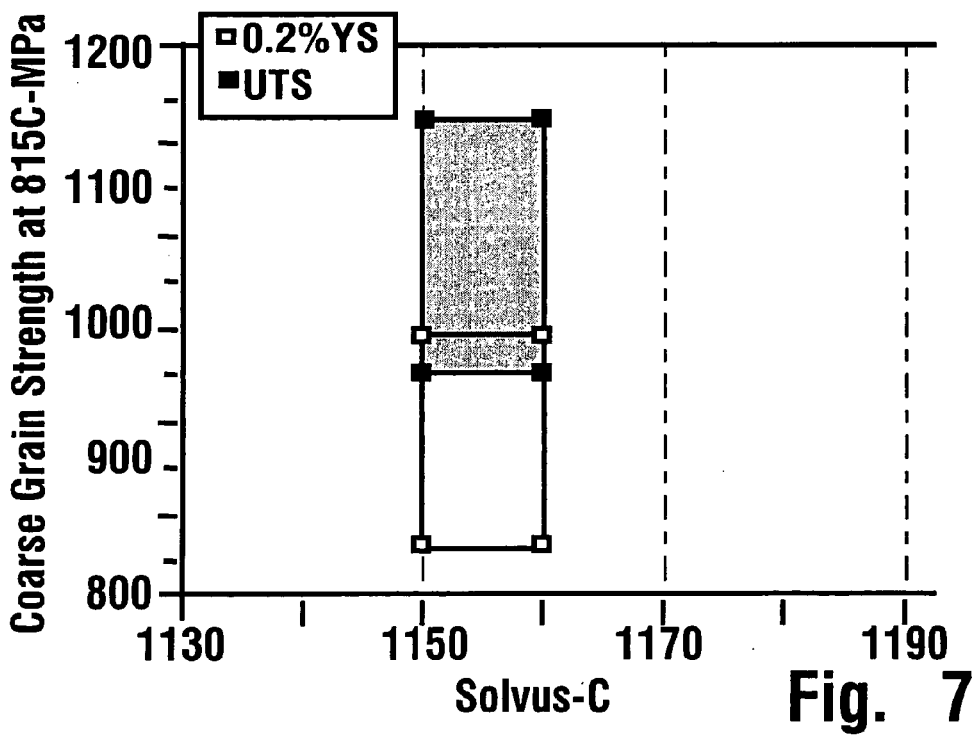
FIG. 7 shows coarse grain alloy typical tensile strength properties at 815° C.

FIGS. 6 and 7 show coarse grain typical tensile strength alloy properties. FIGS. 6 and 7 show the alloy maintaining high strength for coarse grain microstructures at temperatures up to 704° C. and 815° C., respectively. FIG. 6 shows coarse grain strength in MPa at 704° C. versus alloy solvus temperature. FIG. 6 shows the alloy with coarse grain microstructure at 704° C. having an average tensile yield strength of at least 930–1170 MPa and an average ultimate tensile strength of at least 1270–1440 MPa. FIG. 7 shows coarse grain strength in MPa at 815° C. versus alloy solvus temperature. FIG. 7 shows the alloy with coarse grain microstructure at 815° C. having an average tensile yield strength of at least 830–990 MPa and an average ultimate tensile strength of at least 960–1140 MPa.

Figure 8:
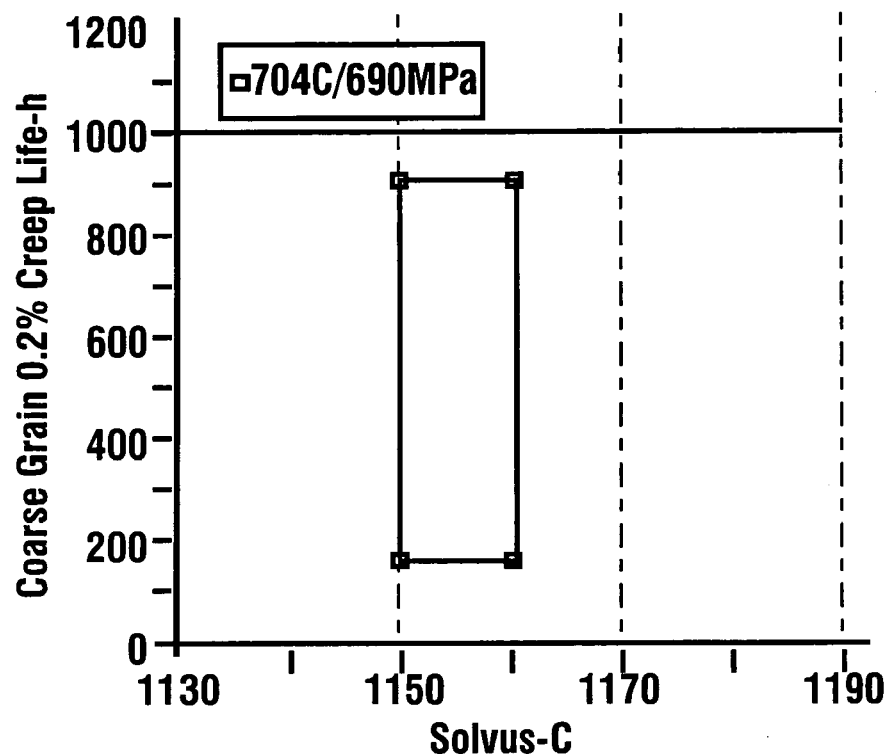
FIG. 8 shows coarse grain alloy typical creep properties at 704° C.
Figure 9:
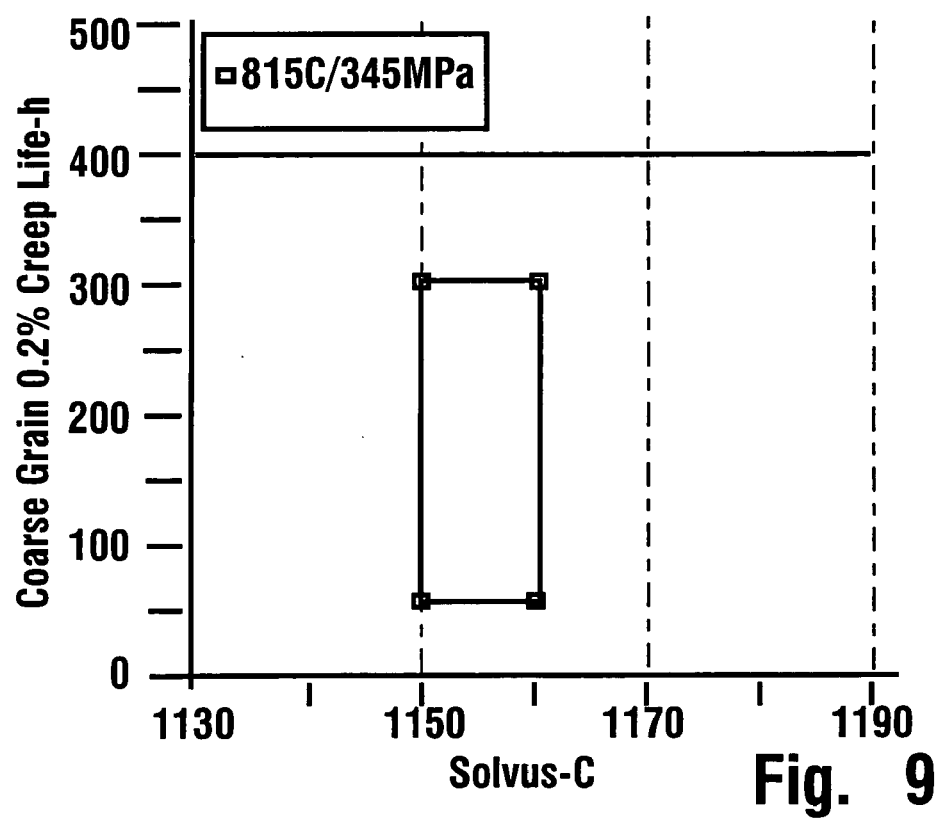
FIG. 9 shows coarse grain alloy typical creep properties at 815° C.

FIGS. 8 and 9 show coarse grain typical creep resistance alloy properties. FIG. 8 shows coarse grain 0.2% creep life in hours at 704° C. and a stress of 690 MPa versus alloy solvus temperature. FIG. 8 shows the alloy with coarse grain microstructure at 704° C. and a stress of 690 MPa having an average life to 0.2% creep of at least 150–900 hours. FIG. 9 shows coarse grain 0.2% creep life in hours at 815° C. and a stress of 345 MPa versus alloy solvus temperature. FIG. 9 shows the alloy with coarse grain microstructure at 815° C. and a stress of 345 MPa having an average life to 0.2% creep of at least 50–300 hours.

Figure 10:
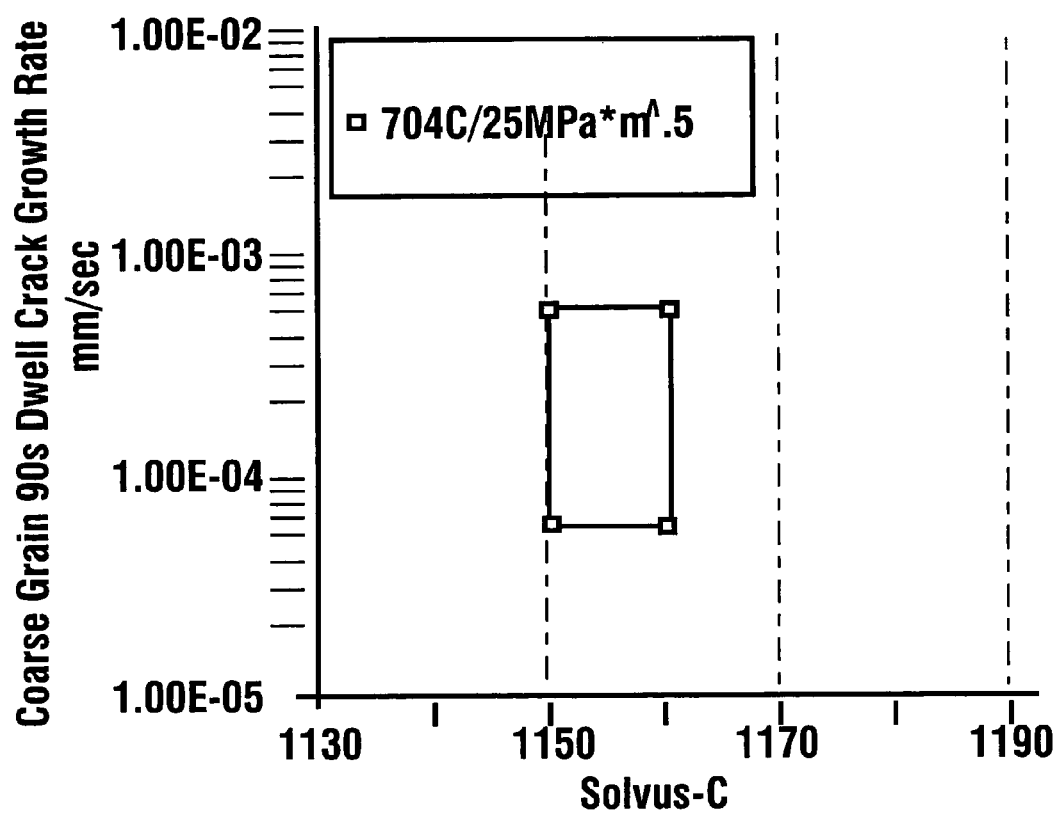
FIG. 10 shows coarse grain alloy typical dwell fatigue crack growth properties.

FIG. 10 shows coarse grain typical dwell fatigue crack growth properties. FIG. 10 shows coarse grain dwell crack growth rate in mm/sec at 704° C. versus alloy solvus temperature. FIG. 10 shows the alloy with coarse grain microstructure at 704° C. has high resistance to crack growth at 704° C. during cycles with 90 second dwells at maximum load, with average crack growth rates of no higher than $5 \times 10^{-5}$ to $5 \times 10^{-4}$ mm/s at a maximum stress intensity of 25 MPa* $m^{0.5}$ and minimum/maximum stress ratio of 0.

Figure 11:
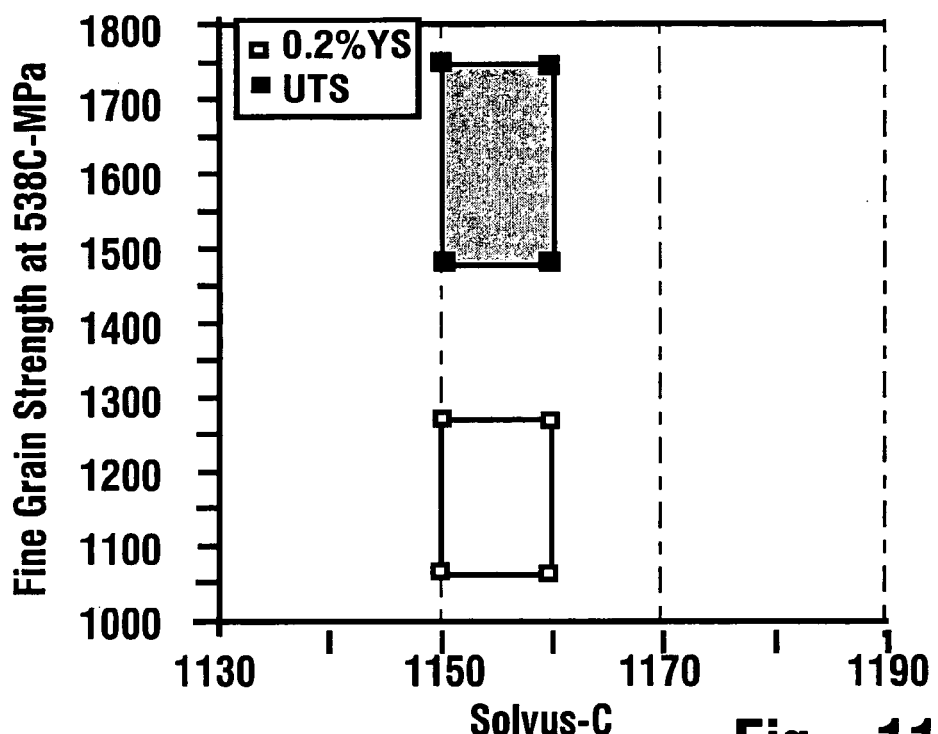
FIG. 11 shows fine grain alloy typical tensile strength properties at 538° C.
Figure 12:
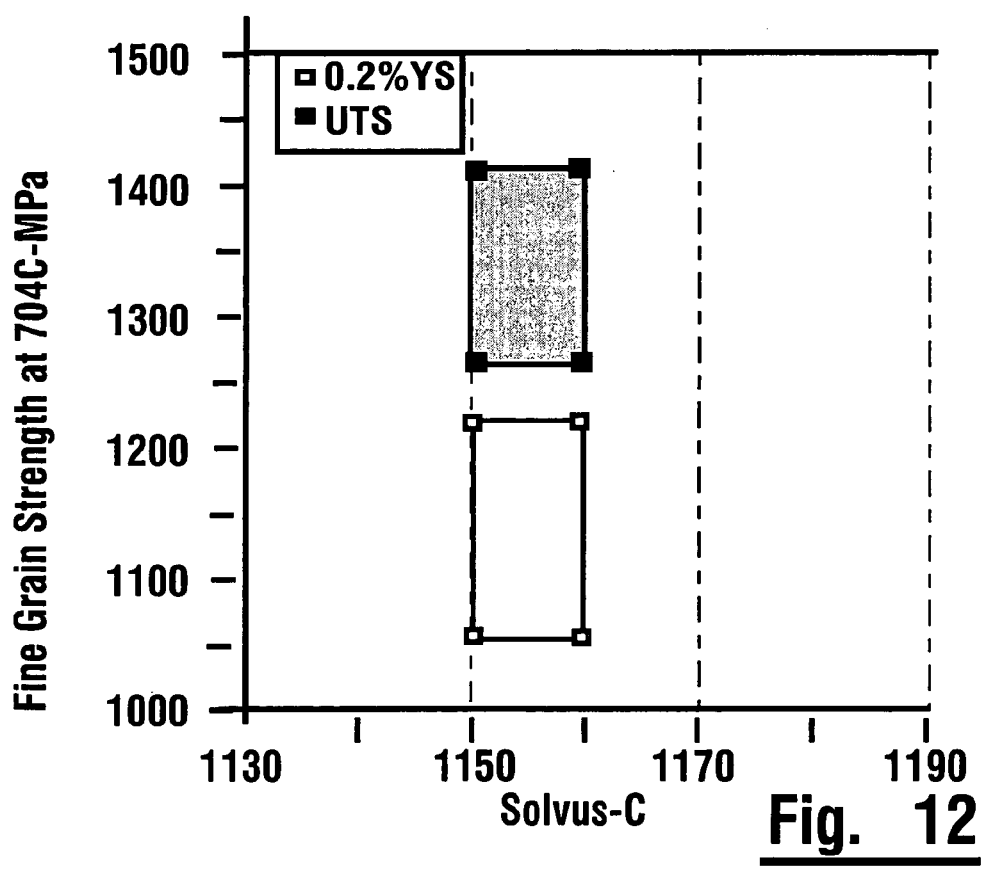
FIG. 12 shows fine grain alloy typical tensile strength properties at 704° C.

FIGS. 11 and 12 show fine grain typical tensile strength alloy properties. FIG. 11 shows fine grain strength in MPa at 538° C. versus alloy solvus temperature. FIG. 11 shows the alloy with fine grain microstructure at 538° C. having an average tensile yield strength of at least 1060–1270 MPa and an average ultimate tensile strength of at least 1470–1760 MPa. FIG. 12 shows fine grain strength in MPa at 704° C. versus alloy solvus temperature. FIG. 12 shows the alloy with fine grain microstructure at 704° C. having an average tensile yield strength of at least 1050–1220 MPa and an average ultimate tensile strength of at least 1270–1420 MPa.

Figure 13:
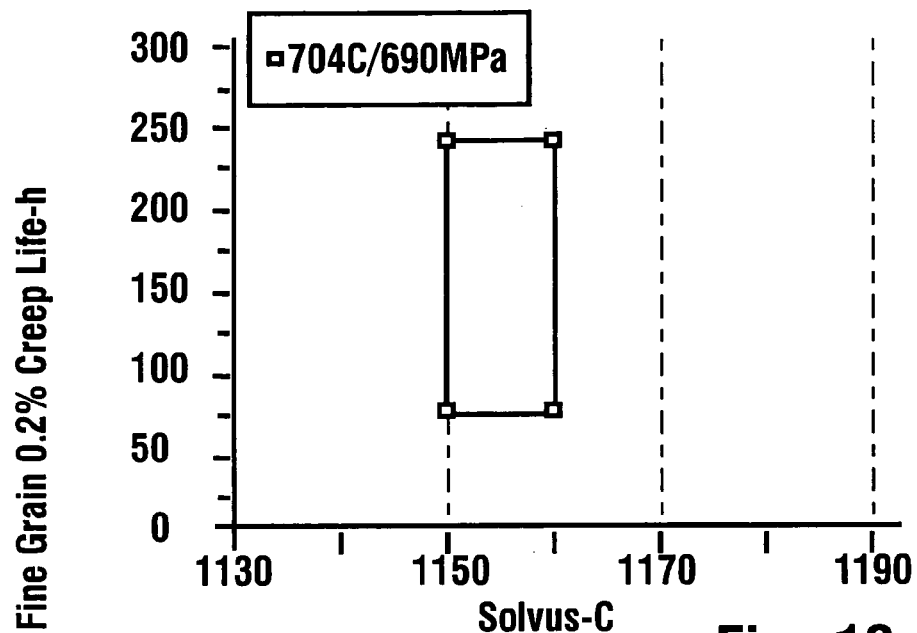
FIG. 13 shows fine grain alloy typical creep properties at 704° C.

FIG. 13 shows fine grain typical creep resistance alloy properties. FIG. 13 shows fine grain 0.2% creep life in hours at 704° C. and a stress of 690 MPa versus alloy solvus temperature. FIG. 13 shows the alloy with fine grain microstructure at 704° C. and a stress of 690 MPa having an average life to 0.2% creep of at least 70–240 hours.

Figure 14:
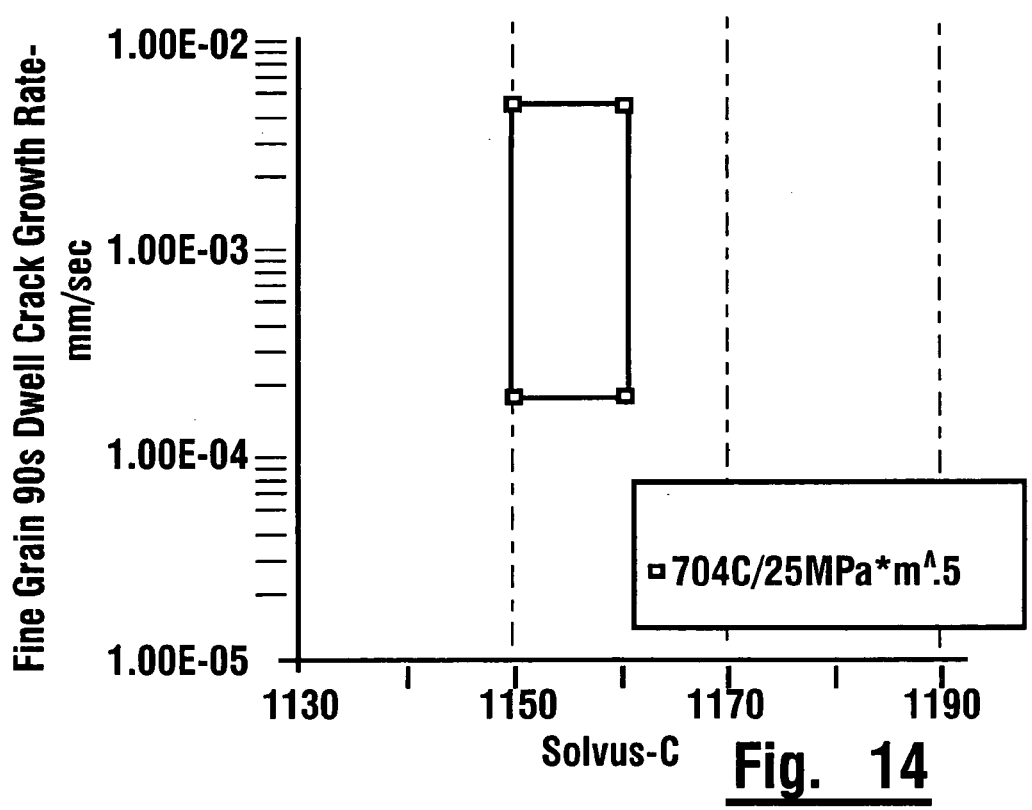
FIG. 14 shows fine grain alloy typical dwell fatigue crack growth properties.

FIG. 14 shows fine grain typical dwell fatigue crack growth properties. FIG. 14 shows fine grain dwell crack growth rate in mm/sec at 704° C. versus alloy solvus temperature. FIG. 14 shows the alloy with fine grain microstructure at 704° C. has high resistance to crack growth at 704° C. during cycles with 90 second dwells at maximum load, with average crack growth rates of no higher than $2 \times 10^{-4}$ to $5 \times 10^{-3}$ mm/s at a maximum stress intensity of 25 MPa* $m^{0.5}$ and minimum/maximum stress ratio of 0.

The alloy can be produced using conventional powder metallurgy processing. For example, the ingredients can be mixed and then vacuum melted to produce ingots having the alloy composition. The ingots can be melted and atomized in an inert environment to produce powder. The powder can be passed through a screen to extract a uniform, conventional powder size distribution, sealed in an air-tight container, then consolidated using hot pressing or hot isostatic pressing at conventional conditions. The consolidated alloy can be extruded into a billet using conventional extrusion temperatures and extrusion ratios. Billet section can then be isothermally forged into the desired disk shape at conventional forging temperatures and strain rates. The disks can then be heat treated. Cooling, aging, and final machining may then follow.

Figure 15:
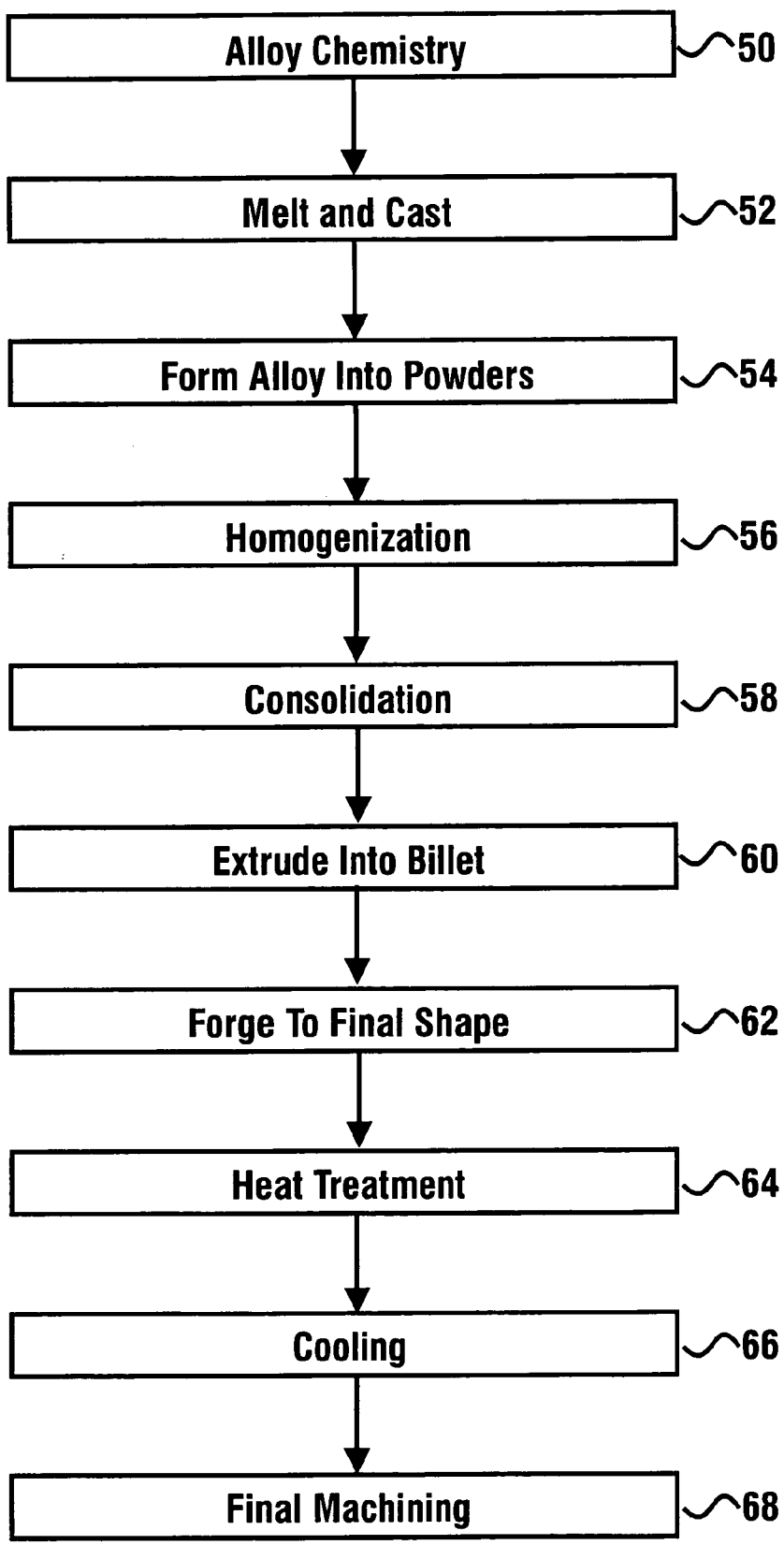
FIG. 15 shows a block diagram depicting a method of fabricating an alloy article.

FIG. 15 shows an exemplary embodiment of processing steps which may be used in preparing an article comprising the Ni base superalloy. The prepared article may be one of those shown in FIGS. 1–5. In particular, FIG. 15 shows a sequence of steps including alloy chemistry 50 (e.g., assembling the component materials to yield the desired elemental content for the alloy); melt and cast 52 (e.g., vacuum melted); form alloy into powder 54; homogenization 56 (e.g., uniform powder size distribution); consolidation 58 (e.g., hot compaction or hot isostatic pressing); work into billet 60 (e.g., hot press or extrude); forge to final shape 62; heat treatment 64; cooling 66; and final machining 68. Of course it should be understood that more or fewer processing steps may be used in article preparation. These individual metallurgy processing steps are conventional and need not be further discussed herein.

The alloy composition permits easy heat treatment thereof. The alloy can have a gamma prime solvus temperature no higher than 1160° C. so that treatments can be performed at temperatures more than 50° C. below the disk melting temperature, to produce either uniform coarse grain microstructure maximizing strength and time-dependent properties at high temperatures up to 815° C., or uniform fine grain microstructures possessing very high strength properties at lower temperatures from 25 to 704° C. As previously discussed, for both coarse and fine grain microstructures, the alloy of the present invention provides excellent tensile and creep properties at a low solvus temperature of below 1160° C. enabling versatile disk processing.

An alloy article may have dual microstructure solution heat treatments. An example, of a process of differentially heat treating a turbine disk may be found in U.S. Pat. No. 5,527,402, the disclosure of which is incorporated herein by reference.

In an exemplary form of the present invention coarse grain microstructures can be produced by solution heat treating the disk material at a relatively wide range of temperatures 10 to 30° C. above the gamma prime solvus, for a wide range of times from 0.1 to 3.0 hours. Versatile and low risk solution heat treatments may be applied for up to three hours.

In an exemplary form of the present invention fine grain microstructures can be produced by solution heat treating the disk material at a relatively wide range of temperatures 30 to 45° C. below the gamma prime solvus for a wide range of times from 0.5 to 3.0 hours. Versatile and low risk solution heat treatments may be applied for up to three hours.

The alloy when properly heat treated is able to be quenched at a wide range of cooling rates of 40 to 167° C./min with either coarse or fine grain microstructure with low probability of forming quench cracks. These versatile, wide range, low risk alloy processing properties are well suited for advanced, optimized dual microstructure solution heat treatments using higher solution heat treatment temperatures in the disk rim to produce coarse grain microstructures and lower solution heat treatment temperatures in the disk bore to produce fine grain microstructures. Thus, the alloy can provide higher temperature capability in the hot turbine disk rim while extracting the higher strength and fatigue resistance at lower temperatures for the cooler bore in high performance turbine disks.

The alloy disks may also be given subsequent heat treatment steps including 760–835° C. for times of 1 to 10 hours, optionally followed by 650 to 759° C. for 2 to 24 hours. These subsequent heat treatment steps can relieve excessive residual stresses that may hinder machinability, while producing the necessary mechanical properties. Furthermore, these subsequent heat treatment steps can be performed for supersolvus or subsolvus solution heat treated disks, and optimized for an application's required mechanical and machinability properties. Advanced subsequent heat treatment steps can also be performed using different temperatures and times in the disk rim form those in the disk bore in order to obtain the best combination of machinability.

As previously discussed, an alloy article may have be provided with a composition of the following approximate content:

| Ingredient | Concentration in Weight % | |
|---|---|---|
| | From | To |
| Al | 3 | 4 |
| B | 0.02 | 0.04 |
| C | 0.02 | 0.05 |
| Cr | 12 | 14 |
| Co | 19 | 22 |
| Mo | 2 | 3.5 |
| Nb | >1 | 2.1 |
| Ta | >1 | 2.1 |
| Ti | 3 | 4 |
| W | >3 | 5 |
| Zr | 0.03 | 0.06 |
| Ni | balance | |

The alloy was conceived with careful consideration and experimental measurements of processing/microstructure parameters, including gamma prime solvus, quench cracking, and phase stability, and including the prime mechanical properties of creep resistance and tensile strength at temperatures approaching 815° C. for coarse grain microstructures, and up to 704° C. for fine grain microstructures. Features of the nickel base superalloy regarding solvus, quench cracking, tensile strength, creep life, phase stability, and mechanical properties are discussed in more detail hereinafter.

Solvus

The solvus temperature was found to decrease with increasing cobalt and chromium level according to the formula $$Ts = A - (B*Co) - (C*Cr) + (D*Ta)$$

where Ts is the effective value of the solvus temperature of gamma prime phase sufficient to hinder grain growth, and A, B, C, and D are constants. Symbols for plus (+), minus (−), multiplication (*), and division (/) are known. Thus, an alloy was selected having a cobalt level in weight percent of about 19–22, chromium level in weight percent of about 12–14, and tantalum level of greater than 1.0 to 2.1, giving a solvus temperature of 1150–1160° C.

Quench Cracking

A high gamma prime content was found to increase propensity for quench cracking. A target range of 50–55 total volume percent of gamma prime was determined to provide a compromise of resistance to quench cracking with creep resistance. A high gamma prime solvus temperature was also found to increase propensity for quench cracking. A gamma prime solvus temperature of 1150–1160° C. was determined to provide sufficient resistance to quench cracking with good tensile and creep resistance. An Al/Ti ratio was found to strongly increase the propensity of quench cracking according to the formula $$QC = A + (B*Al/Ti) + (C*CR)$$

where QC is the propensity of quench cracking, CR is cooling rate, and A, B, and C are constants. A target Al/Ti ratio of about 0.94–1.0 was found to provide a good balance of quench cracking and creep resistance.

Tensile Strength

The yield and ultimate strengths at each temperature were determined using experimentally derived regression equations resulting in the general form $$S = A + (B*W) + (C*Nb) + (D*Mo) + (E*CR)$$

where S is strength, CR is cooling rate, and A, B, C, D, and E are constants. Increasing tungsten produced the largest increase on tensile yield and ultimate strength at both temperatures for the alloys, i.e., approaching 815° C. for coarse grain microstructures, and up to 704° C. for fine grain microstructures. The level of tungsten was determined at greater than 3.0 to 5.0 weight percent. Increasing molybdenum and niobium increased strength to lesser degrees in several cases, including subsolvus strength at 538° C., but they adversely affected density and ductility, respectively. Levels of greater than 1.0 to 2.1 weight percent niobium and 2.0 to 3.5 weight percent molybdenum were determined to improve strength while maintaining acceptable density and ductility.

Creep Life

Increasing the Al/Ti ratio produced the largest increase in creep life at 815° C. and 704° C. for coarse grain microstructures. The effects on creep life were determined using experimentally derived regression equations resulting in the general form $$LCL = A + (B*Al/Ti) + (C*Nb) + (D*W) + (E*CR)$$

where LCL is the logarithm of time to 0.2% creep, CR is cooling rate, and A, B, C, D, and E are constants. It was determined that niobium and tungsten improved creep life at 704° C. for both coarse and fine grain microstructures. However, excessive Al/Ti and Nb values were found to reduce ductility and increase quench cracking. An intermediate Al/Ti ratio of 0.94–1.0 and a >1.0 to 2.1 weight percent Nb were found to balance the creep, tensile, ductility, and quench cracking properties.

Phase Stability

Numerous exposures were performed at temperatures of 704° C. for up to 1200 hours, and at temperatures of 815° C. for up to 600 hours, in the alloy having the composition of the present invention. Subsequent microstructural evaluations indicated that no significant quantities were formed of harmful topological close packed phases, such as sigma, mu, eta, or P.

Mechanical Properties

Mechanical properties are influenced by heat treatment cooling rates as well as chemistry, therefore properties are expressed as a range to cover a very wide, versatile range of cooling rates of 40–167° C./min. When given proper supersolvus solution heat treatment and quench, then subsequent stress relief/aging heat treatments, the alloy has at 815° C. surprisingly high mechanical properties. At 815° C. the alloy has high average tensile yield strength of at least 830–990 MPa and an average ultimate tensile strength of at least 960–1140 MPa. The alloy also has a surprisingly high average life to 0.2% creep at 815° C. and a stress of 345 MPa of at least 50–300 hours. Furthermore, the alloy, when supersolvus solution heat treated, also has surprisingly high mechanical properties at 704° C. At 704° C. the alloy has high average tensile yield strength of 930–1170 MPa and an average ultimate tensile strength of at least 1270–1440 MPa. The alloy also has a surprisingly high average life to 0.2% creep at 704° C. and a stress of 690 MPa of at least 150–900 hours. The alloy further has high resistance to crack growth at 704° C. during cycles with 90 second dwells at maximum load, with average crack growth rates of no higher than $5\times10^{-5}$ to $5\times10^{-4}$ mm/s at a maximum stress intensity of 25 MPa*m$^{0.5}$ and minimum/maximum stress ratio of 0.

When given proper subsolvus solution heat treatment and quench, then subsequent stress relief/aging heat treatments, the alloy has at 704° C. surprisingly high mechanical properties. At 704° C. the alloy with fine grain microstructure at 704° C. has an average tensile yield strength of at least 1050–1220 MPa and an average ultimate tensile strength of at least 1270–1420 MPa. The alloy with fine grain microstructure at 704° C. and a stress of 690 MPa has a high average life to 0.2% creep of at least 70–240 hours. The alloy further has high resistance to crack growth at 704° C. during cycles with 90 second dwells at maximum load, with average crack growth rates of no higher than $2\times10^{-4}$ to $5\times10^{-3}$ mm/s at a maximum stress intensity of 25 MPa*m$^{0.5}$ and minimum/maximum stress ratio of 0. Furthermore, the alloy, when subsolvus solution heat treated, also has surprisingly high mechanical properties at 538° C. At 538° C. the alloy with fine grain microstructure has an average tensile yield strength of at least 1060–1270 MPa and an average ultimate tensile strength of at least 1470–1760 MPa.

In an exemplary form of the present invention the superalloy with coarse grain microstructure at 704° C. can have an average tensile yield of at least 1040 MPa; an average ultimate strength of at least 1350 MPa; at a stress of 690 MPa an average life to 0.2% creep of at least 300 hours; and during cycles with 90 second dwells at maximum load, crack growth rates no higher than $5\times10^{-4}$ mm/s at a maximum stress intensity of 25 MPa*m$^{0.5}$.

In an exemplary form of the present invention the superalloy with coarse grain microstructure at 815° C. can have an average tensile yield of at least 890 MPa, an average ultimate strength of at least 1020 MPa, and at a stress of 345 MPa an average life to 0.2% creep of at least 90 hours.

In an exemplary form of the present invention the superalloy with fine grain microstructure at 538° C. can have an average tensile yield of at least 1140 MPa, an average ultimate strength of at least 1580 MPa.

In an exemplary form of the present invention the superalloy with fine grain microstructure at 704° C. can have an average tensile yield of at least 1140 MPa; an average ultimate strength of at least 1330 MPa; at a stress of 690 MPa an average life to 0.2% creep of at least 90 hours; and during cycles with 90 second dwells at maximum load, average crack growth rates no higher than $5\times10^{-3}$ mm/s at a maximum stress intensity of 25 MPa*m$^{0.5}$ and minimum/maximum stress ratio of 0.

In the foregoing description, certain terms have been used for brevity, clarity and understanding, however, no unnecessary limitations are to be implied therefrom because such terms are for descriptive purposes and are intended to be broadly construed. Moreover, the descriptions and illustrations herein are by way of examples and the invention is not limited to the details shown and described. It is to be understood that various modifications and enhancements may be made without departing form the spirit and scope of the invention.

Further, in the following claims any feature that is described as a means for performing a function shall be construed as encompassing any means capable of performing that function and shall not be limited to the particular means shown in the foregoing description or mere equivalents.

Having described the features, discoveries, and principles of the invention, the manner in which it is constructed and operated, and the useful results attained; the new and useful structures, devices, elements, arrangements, parts, combinations, systems, equipment, operations, methods, and relationships are set forth in the appended claims.

We claim:

1. A turbine disk including a nickel base superalloy having a composition consisting essentially of, in weight percent,
   3.0–4.0 Al,
   0.02–0.04 B,
   0.02–0.05 C,
   12.0–14.0 Cr,
   19.0–22.0 Co,
   2.0–3.5 Mo,
   greater than 1.0 to 2.1 Nb,
   1.3 to 2.1 Ta,
   3.0–4.0 Ti,
   4.1 to 5.0 W,
   0.03–0.06 Zr,
   balance essentially Ni and incidental impurities,
   wherein the turbine disk has a rim portion including coarse grain microstructures capable of withstanding 815° C. and a bore portion including fine grain microstructures capable of withstanding 704° C.

2. The turbine disk of claim 1, wherein the superalloy with coarse grain microstructure at 704° C. has an average tensile yield strength of at least 930–1175 MPa and an average ultimate tensile strength of at least 1275–1445 MPa at the coarse grain microstructure.

3. The turbine disk of claim 1, wherein the superalloy with coarse grain microstructure at 815° C. has an average tensile yield strength of at least 835–990 MPa and an average ultimate tensile strength of at least 960–1140 MPa at the coarse grain microstructure.

4. The turbine disk of claim 1, wherein the superalloy with coarse grain microstructure at 704° C. and a stress of 690 MPa has an average life to 0.2% creep of at least 150–900 hours at the coarse grain microstructure.

5. The turbine disk of claim 1, wherein the superalloy with coarse grain microstructure at 815° C. and a stress of 345 MPa has an average life to 0.2% creep of at least 50–300 hours at the coarse grain microstructure.

6. The turbine disk of claim 1, wherein the superalloy with fine grain microstructure at 533° C. has an average tensile yield strength of at least 1060–1275 MPa and an average ultimate tensile strength of at least 1470–1760 MPa at the fine grain microstructure.

7. The turbine disk of claim 1, wherein the superalloy with fine grain microstructure at 704° C. has an average tensile yield strength of at least 1055–1220 MPa and an average ultimate tensile strength of at least 1270–1420 MPa at the fine grain microstructure.

8. The turbine disk of claim 1, wherein the superalloy with fine grain microstructure at 704° C. and a stress of 690 MPa has an average life to 0.2% creep of at least 70–240 hours at the fine grain microstructure.

9. The turbine disk of claim 1, wherein the superalloy at 704° C. has during cycles with 90 second dwells at maximum load, crack growth rates no higher than $5\times10^{-5}$ to $5\times10^{-4}$ mm/s at a maximum stress intensity of 25 MPa*m$^{0.5}$ and minimum/maximum stress ratio of 0 at the coarse grain microstructure.

10. The turbine disk of claim 1, wherein the superalloy at 704° C. has during cycles with 90 second dwells at maximum load, average crack growth rates no higher than $2\times10^{-4}$ to $5\times10^{-3}$ mm/s at a maximum stress intensity of 25 MPa*m$^{0.5}$ and minimum/maximum stress ratio of 0 at the fine grain microstructure.

11. The turbine disk of claim 1, wherein the composition consists essentially of, in weight percent,
about 3.5 Al,
about 0.03 B,
about 0.03 C,
about 12.5 Cr,
about 20.7 Co,
about 2.7 Mo,
about 1.5 Nb,
about 1.6 Ta,
about 3.5 Ti,
about 4.3 W,
about 0.05 Zr,
balance essentially Ni and incidental impurities.

12. The turbine disk of claim 1, wherein the composition consists essentially of, in weight percent,
3.30–3.46 At
0.026–0.030 B,
0.029–0.044 C,
12.52–13.18 Cr,
20.27–20.70 Co,
2.73–3.27 Mo,
greater than 1 to 1.45 Nb,
1.3 to 1.60 Ta,
3.50–3.58 Ti,
4.10–4.96 W,
0.048–0.050 Zr,
balance essentially Ni and incidental impurities.

13. The turbine disk of claim 12, wherein the composition consists essentially of, in weight percent,
about 3.46 Al,
about 0.028 B,
about 0.029 C,
about 12.52 Cr,
about 20.70 Co,
about 2.73 Mo,
about 1.45 Nb,
about 1.60 Ta,
about 3.50 Ti,
about 4.33 W,
about 0.049 Zr,
balance essentially Ni and incidental impurities.

14. The turbine disk of claim 1, wherein the ratio of Al/Ti is 0.94–1.00.

15. The turbine disk of claim 1, wherein the composition includes 50–55 total volume percent of gamma prime.

16. The turbine disk of claim 1, wherein the balance, in weight percent, includes 43.15–55.43 Ni.

17. The turbine disk of claim 1, wherein the composition consists essentially of, in weight percent,
3.0–4.0 Al,
0.02–0.04 B,
0.02–0.05 C,
12.0–14.0 Cr,
19.0–22.0 Co,
2.0–3.5 Mo,
greater than 1.0 to 2.1 Nb,
1.3 to 2.1 Ta,
3.0–4.0 Ti,
greater than 4.1 to 5.0 W,
0.03–0.06 Zr,
balance essentially Ni and incidental impurities.

* * * * *

UNITED STATES PATENT AND TRADEMARK OFFICE
CERTIFICATE OF CORRECTION

PATENT NO. : 6,974,508 B1
DATED : December 13, 2005
INVENTOR(S) : Gabb et al.

It is certified that error appears in the above-identified patent and that said Letters Patent is hereby corrected as shown below:

Column 12,
Line 43, "533°" should read -- 538° --.

Column 13,
Line 17, "At" should read -- Al --.

Signed and Sealed this

Eighteenth Day of April, 2006

JON W. DUDAS
*Director of the United States Patent and Trademark Office*